US012554618B2

(12) United States Patent
Papadopoulos et al.

(10) Patent No.: US 12,554,618 B2
(45) Date of Patent: Feb. 17, 2026

(54) SYSTEMS AND METHODS FOR PREDICTION OF TEST FAILURES

(71) Applicant: JPMORGAN CHASE BANK, N.A., New York, NY (US)

(72) Inventors: Georgios Papadopoulos, London (GB); Fanny Silavong, London (GB); Sean Moran, London (GB); Alla Nadein, Englewood Cliffs, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 207 days.

(21) Appl. No.: 18/348,849

(22) Filed: Jul. 7, 2023

(65) Prior Publication Data
US 2025/0013555 A1 Jan. 9, 2025

(30) Foreign Application Priority Data
Jun. 10, 2022 (GR) .............................. 20220100486

(51) Int. Cl.
*G06F 11/3604* (2025.01)
*G06F 11/3668* (2025.01)
*G06N 20/00* (2019.01)

(52) U.S. Cl.
CPC ...... *G06F 11/3608* (2013.01); *G06F 11/3696* (2013.01); *G06N 20/00* (2019.01)

(58) Field of Classification Search
CPC .. G06F 11/3608; G06F 11/3696; G06N 20/00
USPC ................................................. 717/120–178
See application file for complete search history.

(56) References Cited

U.S. PATENT DOCUMENTS

| | | | | |
|---|---|---|---|---|
| 6,167,352 A | * | 12/2000 | Kanevsky | G01R 31/318371 714/33 |
| 10,747,651 B1 | * | 8/2020 | Vanderwall | G06F 11/3684 |
| 11,113,175 B1 | * | 9/2021 | Adamo | G06F 40/216 |
| 11,892,507 B2 | * | 2/2024 | Plante | G05B 19/41875 |
| 12,086,701 B2 | * | 9/2024 | Sjögren | G06N 3/048 |
| 2011/0161932 A1 | * | 6/2011 | Nagappan | G06F 11/3616 717/122 |
| 2021/0103840 A1 | * | 4/2021 | Kwong | G06N 20/00 |

(Continued)

OTHER PUBLICATIONS

Ghaffarian, Seyed Mohammad, and Hamid Reza Shahriari. "Software vulnerability analysis and discovery using machine-learning and data-mining techniques: A survey." ACM computing surveys (CSUR) 50.4 (2017): pp. 1-36. (Year: 2017).*

(Continued)

*Primary Examiner* — Satish Rampuria
(74) *Attorney, Agent, or Firm* — GREENBERG TRAURIG LLP

(57) ABSTRACT

Method for prediction of test failures are disclosed. A method may include retrieving, by a test failure prediction computer program, test results for a test; training, by the test failure prediction computer program, a machine learning engine based on one or more hypotheses; receiving, by the test failure prediction computer program, metrics for a code file; providing, by the test failure prediction computer program, the metrics for the code file to the trained machine learning engine; receiving, by the test failure prediction computer program, an output from the trained machine learning engine that provides a probability of failure; and outputting, by the test failure prediction computer program, the output.

17 Claims, 3 Drawing Sheets

(56) References Cited

U.S. PATENT DOCUMENTS

2021/0110284 A1* 4/2021 Rossetto ............... G06N 20/00
2021/0326719 A1* 10/2021 Mahmud ............... G06N 20/00

OTHER PUBLICATIONS

Nguyen, Viet Hung, and Le Minh Sang Tran. "Predicting vulnerable software components with dependency graphs." Proceedings of the 6th international workshop on security measurements and metrics. 2010. pp. 1-8 (Year: 2010).*
Perl, Henning, et al. "Vccfinder: Finding potential vulnerabilities in open-source projects to assist code audits." Proceedings of the 22nd ACM SIGSAC conference on computer and communications security. 2015.pp. 426-437. (Year: 2015).*
Gupta, Rahul, et al. "Deepfix: Fixing common c language errors by deep learning." Proceedings of the aaai conference on artificial intelligence. vol. 31. No. 1. 2017. pp. 1345-1351. (Year: 2017).*
Wójcicki, Bartlomiej, and Robert Dabrowski. "Applying machine learning to software fault prediction." e-Informatica Software Engineering Journal 12.1 (2018). pp. 199-216. (Year: 2018).*
Pandey, Darpan, Kamal Niwaria, and Bharti Chourasia. "Machine learning algorithms: a review." Mach. Learn 6.2 (2019). pp. 916-922 (Year: 2019).*

* cited by examiner

SYSTEMS AND METHODS FOR PREDICTION OF TEST FAILURES

RELATED APPLICATIONS

This application claims priority to, and the benefit of, Greek patent application No. 20220100486, filed Jun. 10, 2022, the disclosure of which is hereby incorporated, by reference, in its entirety.

BACKGROUND OF THE INVENTION

1. Field of the Invention

Embodiments generally relate to systems and methods for prediction of test failures.

2. Description of the Related Art

Testing, such as unit testing, is a fundamental practice of good programming standards. It enables test-driven development and shields the application pipeline from faulty software changes and upgrades. Finding program bugs early in development is cheaper than fixing them afterward—it is estimated that the cost of fixing a bug at a late stage of development can be up to thirty times more expensive than fixing it early on. Running thorough tests, however, requires a substantial amount of computational power and time.

SUMMARY OF THE INVENTION

Systems and methods for prediction of test failures are disclosed. In one embodiment, a method may include: (1) retrieving, by a test failure prediction computer program, historical code files and test results for tests of the historical code files; (2) training, by the test failure prediction computer program, a machine learning engine based on one or more hypothesis for the historical code files and the test results; (3) receiving, by the test failure prediction computer program, a code file and metrics for the code file for evaluation; (4) providing, by the test failure prediction computer program, the metrics for the code file for evaluation to the trained machine learning engine; (5) receiving, by the test failure prediction computer program, a prediction failure from the trained machine learning engine; and (6) outputting, by the test failure prediction computer program, the prediction.

In one embodiment, the hypothesis may be based on a run length of the tests on the historical code files.

In one embodiment, hypothesis may be based on a frequency of changes to the historical code files, a number of users that made changes to the historical code files, a number of files in the historical code files, a date and time of test execution, etc.

In one embodiment, the test failure prediction computer program receives a plurality of tests to evaluate the code file to be evaluated with, and ranks the plurality of tests based on their probability of failure.

In one embodiment, one of the tests may include a unit test.

In one embodiment, the method may also include: providing, by the test failure prediction computer program, the prediction to a large language model or a generative machine learning model; receiving, by the test failure prediction computer program, a corrective action; and implementing, by the test failure prediction computer program, the corrective action.

In one embodiment, the corrective action may include an update to the code file to be evaluated.

According to another embodiment, a system may include: a code repository comprising code files for evaluation; a test database comprising historical code files and test results for tests of the historical code files; and an electronic device executing a test failure prediction computer program that retrieves the historical code files and the test results for tests of the historical code files, trains a machine learning engine based on one or more hypothesis for the historical code files and the test results, receives one of the code files for evaluation and metrics for the code file, provides the metrics for the code file for evaluation to the trained machine learning engine, receives a prediction failure from the trained machine learning engine, and outputs the prediction.

In one embodiment, the hypothesis may be based on a run length of the tests on the historical code files, a frequency of changes to the historical code files, a number of users that made changes to the historical code files, a number of files in the historical code files, a date and time of test execution, etc.

In one embodiment, the test failure prediction computer program receives a plurality of tests to evaluate the code file to be evaluated with, and ranks the plurality of tests based on their probability of failure.

In one embodiment, one of the tests may include a unit test.

In one embodiment, the test failure prediction computer program provides the prediction to a large language model or a generative machine learning model, retrieves a corrective action, and implements the corrective action.

In one embodiment, the corrective action may include an update to the code file to be evaluated.

According to another embodiment, a non-transitory computer readable storage medium, may include instructions stored thereon, which when read and executed by one or more computer processors, cause the one or more computer processors to perform steps comprising: retrieving historical code files and test results for tests of the historical code files; training a machine learning engine based on one or more hypothesis for the historical code files and the test results, wherein the hypothesis may be based on a frequency of changes to the historical code files, a number of users that made changes to the historical code files, a number of files in the historical code files, a date and time of test execution, or a run length of the tests on the historical code files; receiving a code file and metrics for the code file for evaluation; providing the metrics for the code file for evaluation to the trained machine learning engine; receiving a prediction failure from the trained machine learning engine; and outputting the prediction.

In one embodiment, the non-transitory computer readable storage medium may also include instructions stored thereon, which when read and executed by one or more computer processors, cause the one or more computer processors to perform steps comprising: providing the prediction to a large language model or a generative machine learning model; receiving a corrective action, wherein the corrective action may include an update to the code file to be evaluated; and implementing the corrective action.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments generally relate to systems and methods for prediction of test failures.

Embodiments may evaluate code based on one or more hypotheses and may predict whether code is likely to fail one or more tests using a trained machine learning engine. The results may be used to identify and apply corrective action(s) to the code before the tests are run.

Embodiments may use a set of hypothesis tests that source information from code repositories, including the number of changes that happened on a code file, the number of different users that worked on/made changes to that code file, the frequency of changes to the code file, etc. Embodiments may map correlations between one or more of these metrics and the fail/success cases of one or more tests, and may then use machine learning based classification methods to make predictions as to a likelihood of the code failing the tests.

Illustrative examples of hypotheses may include:

1: Failure rates are higher for longer running tests. The more dependent a test is on the environment it runs in—databases, messaging busses, file systems, external services, etc.—the more opportunities it has to fail. Such comprehensive test runs orders of magnitude longer than a test that uses mocked objects, in-memory stores, and service contracts.

2: Frequently modified source files are more often to cause previously passing tests to fail. The very need to keep modifying the same file may indicate an opportunity to redesign or a need to reflect a frequently changing requirement.

3: Files modified by more than one author within a short time span are more likely to cause breakages compared to a single author's changes. This may happen if developers do not understand each other's code well and, as a result, introduce fragile changes.

4: Commits with a large number of files are more likely to cause breakage compared to commits with small number of files.

It should be noted that embodiments are not limited to these hypotheses, and additional hypothesis may be used as is necessary and/or desired.

Figure 1:
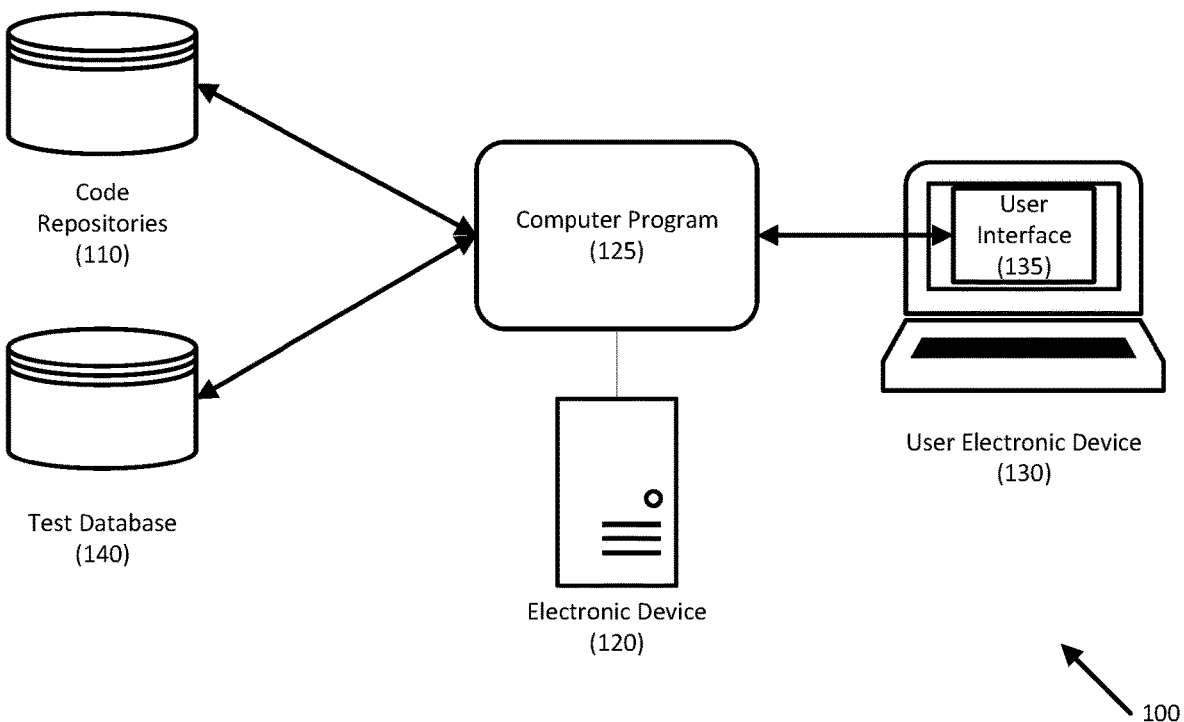
FIG. 1 depicts a system for prediction of test failures is provided according to an embodiment.

Referring to FIG. 1, a system for prediction of test failures is provided according to an embodiment. System 100 may include one or more code repository 110, electronic device 120 executing test failure prediction computer program 125, user interface 135 on user electronic device 130, and test result database 140.

In one embodiment, code repositories 110 may store historical code files, metrics (e.g., the number of changes to a code file, the number of different users that accessed and/or worked on a code file, the frequency of the changes, the date and time of changes, user triggers of a build and commit, etc.). Other metrics may be stored as is necessary and/or desired.

Test result database 140 may store results of one or more tests, such as unit tests, on the historical code files. The results may be associated with one or more of the metrics regarding the historical code file that failed or passed the test.

Electronic device 120 may be a server (e.g., physical and/or cloud-based) that may interface with code repositories 110 and user interface 135 on user electronic device. Test failure prediction computer program 125 may retrieve code files and metadata from code repositories 110 and may train a machine learning engine based on one or more hypotheses and the test results.

User interface 135 may provide access for a user to provide a code file to be evaluated to the trained machine learning engine to predict whether the code file will fail one or more tests. The trained machine learning engine may output a prediction, such as a probability of failure (e.g., a value between 0 and 1, red-yellow-green, pass/fail, etc.), and may rank the tests based on their prediction of failure.

Figure 2:
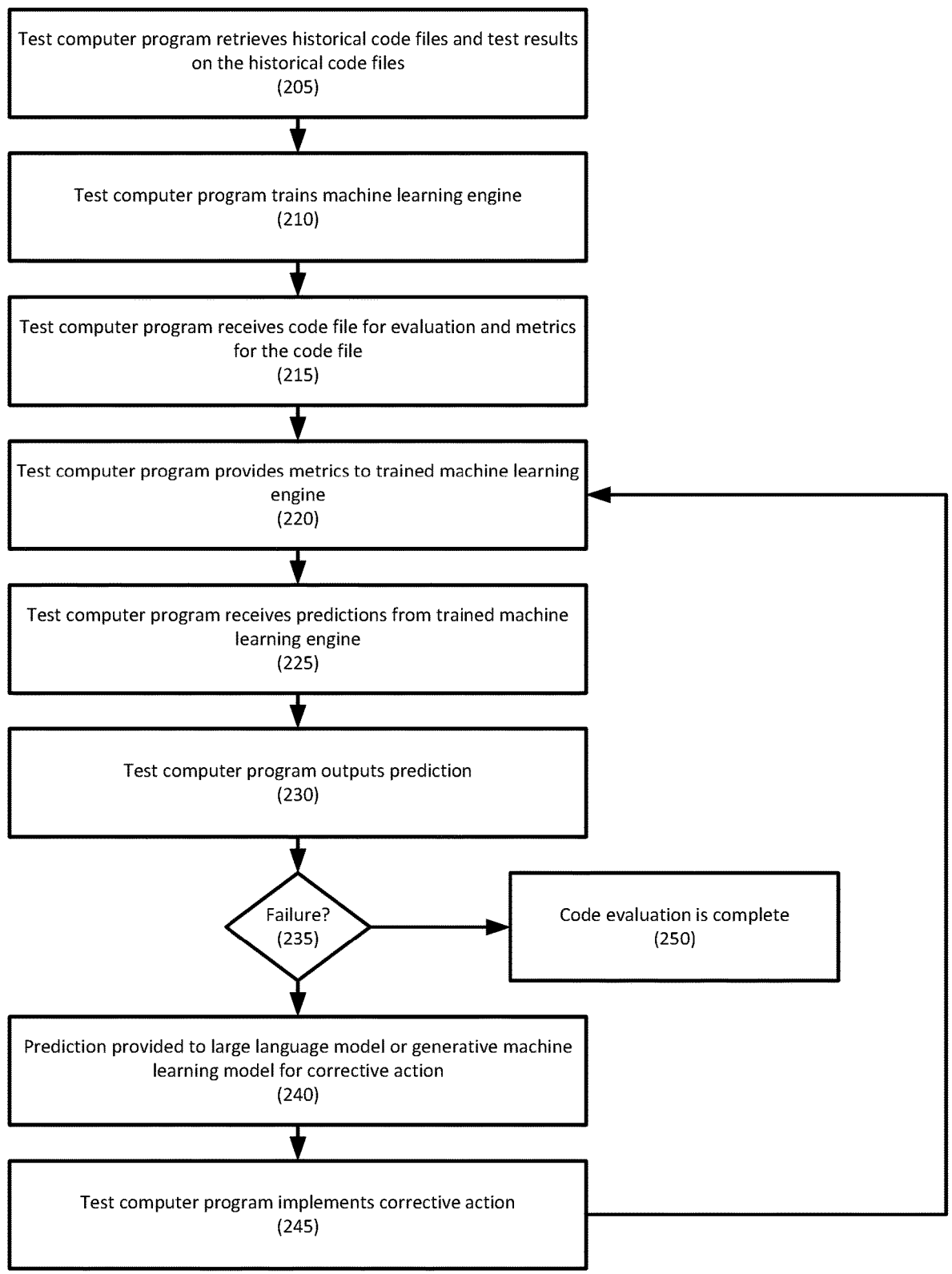
FIG. 2 depicts a system for prediction of test failures is provided according to an embodiment.

Referring to FIG. 2, a method for prediction of test failures is provided according to an embodiment.

In step 205, a test failure prediction computer program may retrieve historical code files and test results performed on the historical test files. The test failure computer program may also receive metrics for the historical test files, such as the frequency of code changes in the historical code files, the number of users that made changes to the historical code files, the number of files in the historical code files, etc. It may also receive test results and metrics for tests performed on the historical code files, including an outcome (e.g., pass/fail), the run length of the tests, the date and time of test execution, etc.

In step 210, the test failure computer program may use the historical code files, the metrics for the historical code files, the test results for tests on the historical code files, and metrics for those tests, to train a machine learning engine on one or more hypotheses. For example, the test failure prediction computer program may train the machine learning engine based on the frequency of code changes in the historical code files, the number of users that made code changes to the historical code files, the number of files in the historical code files, test results for tests run on the historical code files, the run length of the test, the date and time of test execution, etc.

The tests may be, for example, unit tests.

In step 215, the test failure prediction computer program may receive metrics for a code file to evaluate, such as a frequency of code changes to the code file, a number of users that made code changes to the code file, and a number of files in the code file.

In one embodiment, the test failure prediction computer program may also receive the code file to be evaluated and may extract the metrics, as available, from the code file to be evaluated.

In step 220, the test failure prediction computer program may provide the metrics for the code file to be evaluated to the trained machine learning engine.

In step 225, the trained machine learning engine may output a prediction based on the metrics for the code file and may provide the prediction to the test failure prediction computer program. The prediction may be a probability of code failure.

In step 230, the test failure prediction computer program may output the prediction. If the prediction is a failure prediction, the test failure computer program may identify the reason for the prediction (e.g., a high number of users making code changes). If there are multiple reasons, the test failure computer program may rank the reasons based on their probabilities.

In one embodiment, the test failure prediction computer program may also identify one or more tests that the code file is predicted to fail. If there are multiple tests with this prediction, the test failure computer program may rank the tests based on the probability of failure.

In step 235, if the prediction is a failure prediction, in step 240, the test failure prediction computer program may provide the prediction to, for example, a large language model or generative machine learning model to identify a corrective action for the failure. Examples of corrective actions may include code updates, code changes, etc.

In step 245, once the solution is identified, the test failure computer program may implement the corrective action by, for example, updating the code. The updated code may then be evaluated in step 220.

If the prediction does not indicate failure, in step 250, the process may be complete.

Figure 3:
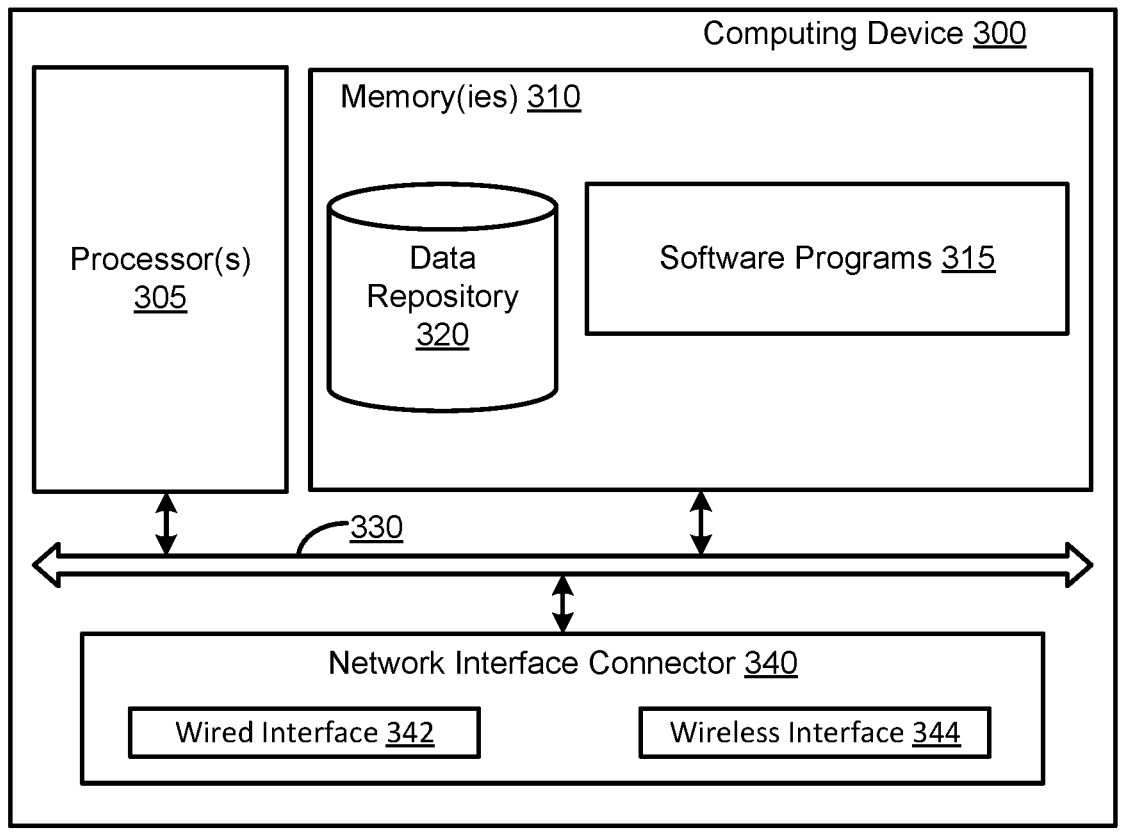
FIG. 3 depicts an exemplary implementation according to an embodiment.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-implemented method for prediction of test failures, comprising:
retrieving, by a test failure prediction computer program stored in memory and executed by a computer processor, historical code files and test results for tests of the historical code files;
identifying, by the test failure prediction computer program, one or more hypothesis from metrics for the historical code files;
training, by the test failure prediction computer program, a machine learning engine based on the one or more hypothesis for the historical code files and the test results;
receiving, by the test failure prediction computer program, a code file and metrics for the code file for evaluation;
providing, by the test failure prediction computer program, the metrics for the code file for evaluation to the trained machine learning engine;
receiving, by the test failure prediction computer program, a prediction failure from the trained machine learning engine;
outputting, by the test failure prediction computer program, the prediction;

providing, by the test failure prediction computer program, the prediction to a large language model or a generative machine learning model;

receiving, by the test failure prediction computer program, a corrective action; and implementing, by the test failure prediction computer program, the corrective action.

2. The computer-implemented method of claim 1, wherein the metric comprises a run length of the tests on the historical code files.

3. The computer-implemented method of claim 1, wherein the metric comprises a frequency of changes to the historical code files.

4. The computer-implemented method of claim 1, wherein the metric comprises a number of users that made changes to the historical code files.

5. The computer-implemented method of claim 1, wherein the metric comprises a number of files in the historical code files, or a date and time of test execution.

6. The computer-implemented method of claim 1, wherein the test failure prediction computer program receives a plurality of tests to evaluate the code file to be evaluated with, and ranks the plurality of tests based on their probability of failure.

7. The computer-implemented method of claim 1, wherein one of the tests comprises a unit test.

8. The computer-implemented method of claim 1, wherein the corrective action comprises an update to the code file to be evaluated.

9. A system, comprising:

a code repository comprising code files for evaluation;

a test database comprising historical code files and test results for tests of the historical code files; and an electronic device comprising a computer processor and executing a test failure prediction computer program that is configured to retrieve the historical code files and the test results for tests of the historical code files, to identify one or more hypothesis from metrics for the historical code files, to train a machine learning engine based the on one or more hypothesis for the historical code files and the test results, receives one of the code files for evaluation and metrics for the code file, to provide the metrics for the code file for evaluation to the trained machine learning engine, to receive a prediction failure from the trained machine learning engine, to output the prediction, to provide the prediction to a large language model or a generative machine learning model, to retrieve a corrective action and to implement the corrective action.

10. The system of claim 9, wherein the metric comprises a run length of the tests on the historical code files.

11. The system of claim 9, wherein the metric comprises a frequency of changes to the historical code files.

12. The system of claim 9, wherein metric comprises a number of users that made changes to the historical code files.

13. The system of claim 9, wherein the metric comprises a number of files in the historical code files, or a date and time of test execution.

14. The system of claim 9, wherein the test failure prediction computer program receives a plurality of tests to evaluate the code file to be evaluated with, and ranks the plurality of tests based on their probability of failure.

15. The system of claim 9, wherein one of the tests comprises a unit test.

16. The system of claim 9, wherein the corrective action comprises an update to the code file to be evaluated.

17. A non-transitory computer readable storage medium, including instructions stored thereon, which when read and executed by one or more computer processors, cause the one or more computer processors to perform steps comprising:

retrieving historical code files and test results for tests of the historical code files;

identifying one or more hypothesis from metrics for the historical code files;

training a machine learning engine based on the one or more hypothesis for the historical code files and the test results, wherein the metric comprises a frequency of changes to the historical code files, a number of users that made changes to the historical code files, a number of files in the historical code files, a date and time of test execution, or a run length of the tests on the historical code files;

receiving a code file and metrics for the code file for evaluation;

providing the metrics for the code file for evaluation to the trained machine learning engine;

receiving a prediction failure from the trained machine learning engine;

outputting the prediction;

providing the prediction to a large language model or a generative machine learning model;

receiving a corrective action, wherein the corrective action comprises an update to the code file to be evaluated; and implementing the corrective action.

\* \* \* \* \*